United States Patent [19]

Weber et al.

[11] Patent Number: 4,521,076
[45] Date of Patent: Jun. 4, 1985

[54] TRANSMITTED-LIGHT ILLUMINATING DEVICE

[75] Inventors: Klaüs Weber; Manfred Willert, both of Königsbronn; Heinz Blessmann, Rosdorf, all of Fed. Rep. of Germany

[73] Assignee: Carl-Zeiss-Stiftung, Oberkochen, Fed. Rep. of Germany

[21] Appl. No.: 511,207

[22] Filed: Jul. 6, 1983

[30] Foreign Application Priority Data

Jul. 8, 1982 [DE] Fed. Rep. of Germany ....... 3225479

[51] Int. Cl.$^3$ .......................... G02B 7/00; G02B 21/14
[52] U.S. Cl. .................................... 350/254; 350/449; 350/520; 350/526
[58] Field of Search ............... 350/252, 254, 448, 449, 350/509, 510, 520, 523, 525, 526, 529

[56] References Cited

U.S. PATENT DOCUMENTS

| | | | |
|---|---|---|---|
| 3,922,699 | 11/1975 | Yamahi | 350/449 |
| 4,299,440 | 11/1981 | Hodgson | 350/529 |
| 4,363,532 | 12/1982 | Weber | 350/523 |
| 4,368,947 | 1/1983 | Yoshinaga et al. | 350/526 |

Primary Examiner—Bruce Y. Arnold
Assistant Examiner—William Propp
Attorney, Agent, or Firm—Hopgood, Calimafde, Kalil, Blaustein & Judlowe

[57] ABSTRACT

A transmitted-light illuminating device (FIG. 1) for microscopes consists of a condenser (1), an iris-aperture diaphragm (2) and a turret (3). The turret permits interchangeable mounting of auxiliary lenses (4) or diaphragms (5) by means of which large-object fields can be illuminated, if desired; alternatively, the microscope can be used in phase contrast. Condenser, diaphragm and turret are combined into a unit in which the turret is functionally coupled to the iris diaphragm. For this purpose, the index shaft of the turret (3) is eccentrically mounted to the actuating ring (9) of the diaphragm (2), the ring is configured for detent engagement to retain the newly indexed turret station in axial register with the optical axis of the condenser. Thus, rotation of the turret first drives the actuating ring (9) against its diaphragm stop to thereby open the diaphragm before there is any indexing movement of the turret, from one to its next indexed position.

9 Claims, 2 Drawing Figures

TRANSMITTED-LIGHT ILLUMINATING DEVICE

BACKGROUND OF THE INVENTION

Transmitted-light illuminating devices for microscopes in the higher-price category have a centerable and focusable condenser, an iris-aperture diaphragm in the rear focal plane of the condenser, as well as an indexible turret. The turret contains centerable diaphragms (or auxiliary lenses), polarizers and filters for performing different contrasting methods, as well as selectively attachable auxiliary lenses for illuminating large fields of view or for magnifying enlargement. Since a large number of adjusting means must be actuated, such illuminating devices are not easy to handle and they entail the danger of erroneous operation even for the expert, as for example, by mistakenly closing the aperture diaphragm when making a phase-contrast observation.

To avoid such operating error, West German published patent application OS No. 3,042,186 discloses a coupling of the iris-aperture diaphragm to the turret via a spring and a control lever, in such manner that the diaphragm remains open in the "phase contrast" position of the turret. But this known illuminating device achieves no reduction in the required number of adjustment levers; the iris-aperture diaphragm and the turret are actuated by separate setting levers.

Furthermore, illuminating devices for less expensive microscopes, as for school instruction, are known to be of greatly simplified construction However, their simplification is obtained at the expense of important functions, as for example, by omitting any provision for vertical displacement of the condenser, thus precluding exact setting of Köhler illuminating conditions.

In one such illuminating device having a fixed condenser, it is known to couple the actuating lever of a switchable auxiliary lens or ring diaphragm, to the control member for the aperture diaphragm. This known device comprises a switch rocker which is fastened on a pivot shaft which can be displaced about the optical axis. When the rocker is reversed, the lens holder engages in a slide seat on the condenser housing; it can be rotated about the optical axis, via the actuating lever of the rocker, driving along with it the finger which controls the diaphragm.

In this device, therefore, the diaphragm-actuating lever is eliminated, without dispensing with the function of the iris diaphragm, while at the same time the iris-aperture diaphragm is opened fully upon switching into the "auxiliary lens" or "phase-contrast" position; and upon switching back into the starting position, the diaphragm is also closed again.

But this known device has the disadvantage that the number of switch positions is limited to two. There are no additional possibilities of contrasting, aside from the bright-field illumination of small-object fields and, upon addition of a lens, of large-object fields. If it is now desired to use the microscope for phase contrast, the entire switch rocker must be replaced by one which carries, in place of the auxiliary lens, a ring diaphragm which can be centered by means of knurled screws.

It is not readily possible to avoid this troublesome replacement by increasing the number of switch positions, since the range of movement of the switch rocker is limited, by reason of its engagement with the control finger of the diaphragm.

BRIEF STATEMENT OF THE INVENTION

It is the object of the present invention to provide coupling between turret and diaphragm in a microscope-illuminating system of the character indicated (a) so that free shifting of turret position is assured, (b) so that it is possible to increase the number of usable switch positions, and (c) so that one can avoid any need for a separate control of diaphragm setting.

This object is achieved by providing a turret with at least three openings, for optional accommodation of detachable inserts, such as ring diaphragms and/or auxiliary lenses. The turret is mounted for indexible shifting of a selected opening into and out of the optical axis. Indexing is about an index shaft that is eccentrically carried by a diaphragm-control ring, and the latter is rotatable about the optical axis. Detent coaction between the turret and the diaphragm-control ring serves to retain a given index position so that diaphragm control is possible by displacing the turret about the optical axis.

The illuminating device of the invention makes it possible for the user himself to perform ordinary contrasting methods in simple fashion, i.e., by suitably equipping the various receiving openings, all without changing the turret. Since the turret is free to move, there is assurance, for a given direction of switching, that the aperture diaphragm will always be open after each switch of the turret to its next indexed position.

It is advisable that all receiving openings in the turret be identical to each other since this facilitates the equipping of them.

It is further advantageous for the turret to be annular, with a peripheral knurl, and to be characterized by differently shaped marks, for example, actuating fingers of different length, at angular spacings which correspond to the number of receiving openings. The user can then effect "a blind" setting of the desired switch or index position, i.e., without having to look at the turret.

When using the microscope in phase contrast, it is necessary to center the ring diaphragm in the focal plane of the condenser relative to the phase ring in the exit pupil of the objective. This is ordinarily done by means of two adjustment screws by which the diaphram insert can be displaced. Since such adjustment screws, however, make the changing of the inserts very difficult, it is desirable to provide the insert of the ring diaphragm carrier with a convex spherical formation which is universally mounted in a suitable holder and which provides frictional retention of any adjusted position of the carrier about the spherical center, thus enabling a simple adjusted centering of the ring diaphragm.

DETAILED DESCRIPTION

Figure 1:
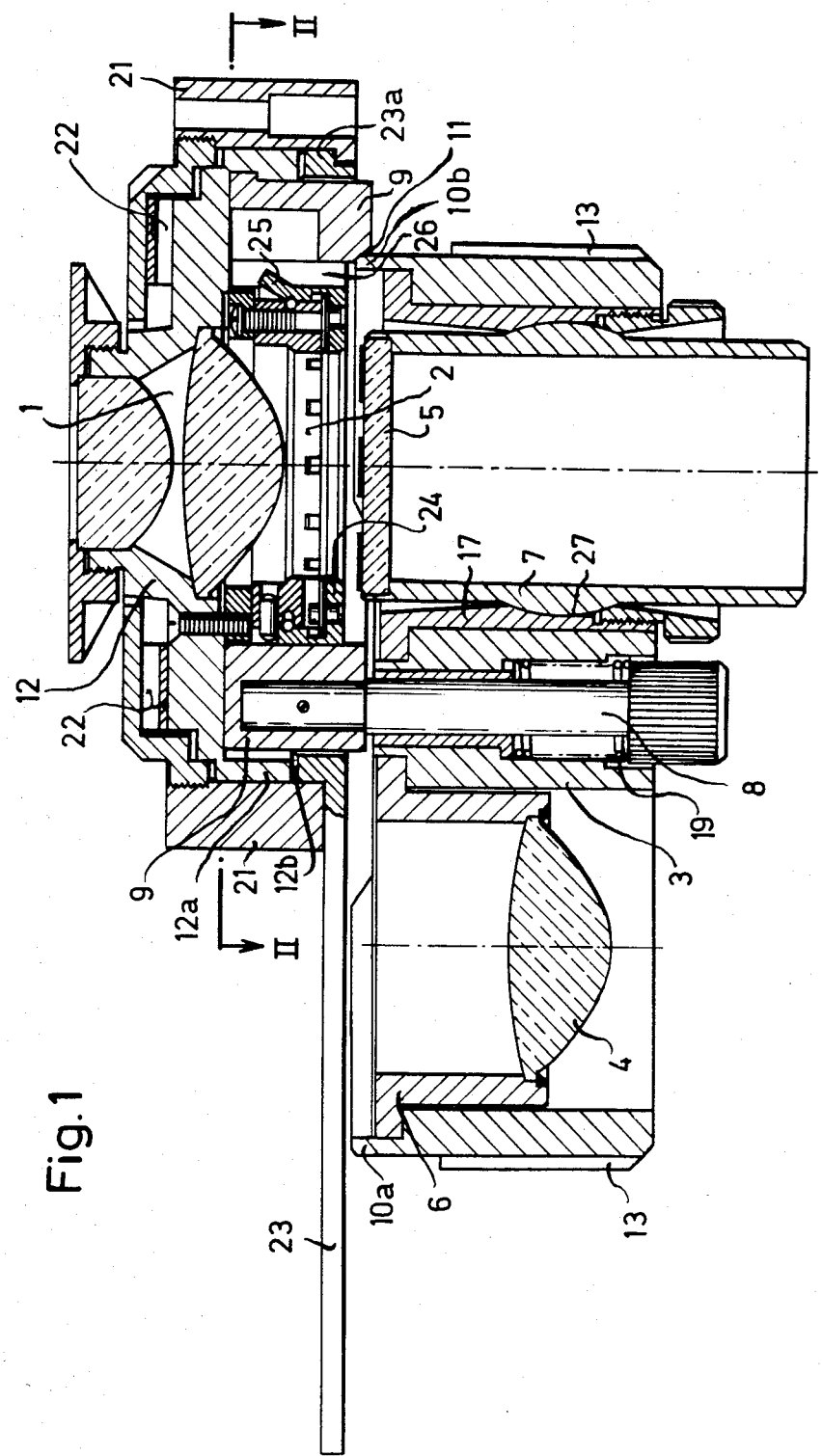
Figure 2:
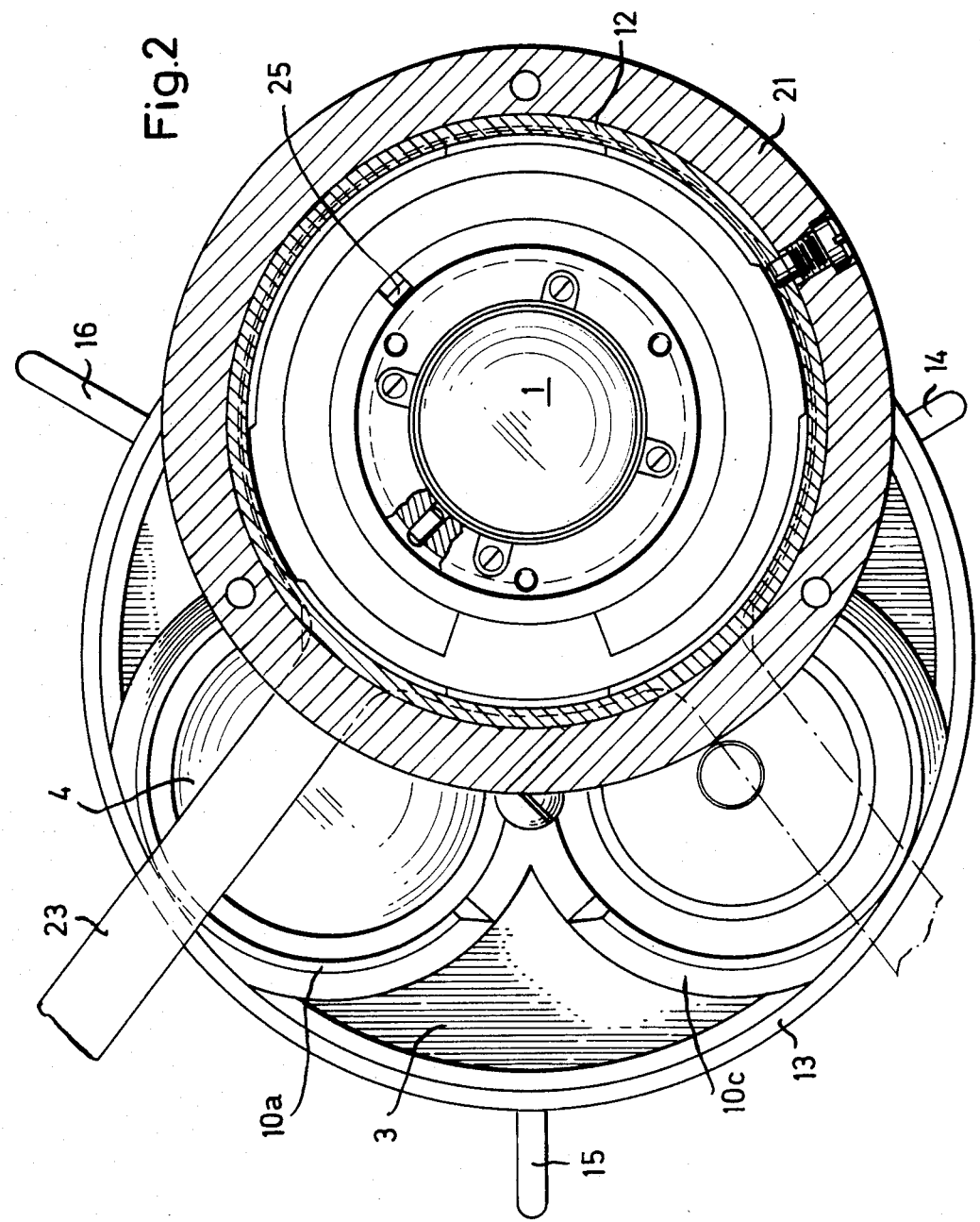

The invention will be described in detail, in conjunction with the accompanying drawings, in which:

FIG. 1 is a sectional view through an illuminating device of the invention, taken in a plane which contains the optical axis; and FIG. 2 is another section, along the line II—II of FIG. 1.

In the illuminating device of FIGS. 1 and 2, a two-lens condenser 1, an iris-aperture diaphragm 2, and an indexible turret 3 are combined to form a single structural unit. The turret is equipped with an auxiliary lens 4 and with a ring diaphragm 5 which may be selectively indexed into and out of the optical axis of the condenser and diaphragm.

The mount 12 for the condenser 1 is adapted for axial displacement against the force of a corrugated spring washer 22, the latter being retained in a stationary housing part 21 which is secured to the stage of a microscope. A lower part 12a of the mount 12 has the shape of an annular sleeve and is provided at its end 12b with a sawtooth-like profile; the end 12b engages the mating profile of an annular shoulder 23a of a focusing lever 23. Thus, a partial rotation of the focusing lever 23 effects an axial displacement of the condenser 1. The iris-aperture diaphragm 2 and the turret 3 are axially displaced with the condenser 1, since all three of these components form a structural unit.

The iris diaphragm 2 includes a rotatable ring 24 by which diaphragm blades are actuated. This ring 24 is provided with a projection 25 which has keyed engagement with an axial groove 26 in a diaphragm-actuating ring 9. The iris diaphragm 2 opens or closes, in accordance with the direction of rotary adjustment of ring 9, and such rotation of ring 9 is limited by stops at the full-open and fully-closed settings of diaphragm 2.

The index shaft 8 for turret 3 is fixed to ring 9. Turret 3 has three index positions, in which any one of three different receiving openings can be selectively positioned below the condenser 1, i.e., on the optical axis. As shown in FIG. 2, the receiving openings are provided in a knurled annulus or ring 13, and the ring has three actuating fingers 14, 15 and 16 for rotary positioning of the turret. The actuating fingers are of different length in order to enable "touch" recognition of the currently indexed position, i.e., without need for visual assurance.

In the illustrative embodiment shown, one of the receiving openings of the turret is not equipped. A removable insert 6 at the second opening mounts the auxiliary lens 4, for illumination of large-object fields. A removable insert 17 at the third opening carries the holder 7 of a ring diaphragm 5 for phase-contrast illumination. The holder 7 comprises a sleeve which has a convex spherical formation 27 by means of which the sleeve can be universally tilted within a small-angle range, for purposes of centering the ring diaphragm 5.

All three receiving openings are provided with extensions in the form of conical ring segments 10a-b-c. Each of these ring segments is engageable with a conical seat 11 in the diaphragm-actuating ring 9, when indexed into the optical axis. In achieving this engagement, the entire turret 3 shifts axially, against the force of spring 19, along the index axis 8.

Once one of the conical ring segments 10 of the turret 3 has engaged the seat 11 of ring 9, the diaphragm can be set by means of an operating member of the turret 3, i.e., by one of the fingers 14 to 16. In this connection, the turret-index shaft 8, being fixed to ring 9, moves on a circular path about the optical axis of the condenser 1.

If the turret 3 is further rotated in the same direction in order to change index positions, assurance is had that diaphragm 2 is fully open after each indexing. This follows from the fact that ring 9 rotates with only slight friction, and the segments 10 engage or disengage only when further rotation of ring 9 has been limited by abutment against one of the stops which limit the aperture range of the diaphragm 2.

What is claimed is:

1. A transmitted-light illuminating device having a condenser (1) and an iris-aperture diaphragm (2) on an optical axis, and a turret (3) for the indexed switching-in of auxiliary lenses (4) and/or diaphragms (5), the turret (3) being coupled with the iris-aperture diaphragm (2), characterized by the fact that the turret (3) has at least three receiving openings adapted for optional provision of a ring-diaphragm (5) inserts (7) and/or auxiliary-lens (4) inserts (6) and is mounted for indexed rotation about an index shaft (8), said index shaft (8) being carried at a fixed eccentric location on a ring (9) which controls the opening of the iris diaphragm and which is rotatable about the optical axis, and detent means coacting between the turret (3) and the ring (9) to provide detent retention of each index position at which one of the receiving openings is centered on the optical axis.

2. A transmitted-light illuminating device according to claim 1, characterized by the fact that the receiving openings are identical to each other.

3. A transmitted-light illuminating device according to claim 1, characterized by the fact that one of the inserts is a ring-diaphragm carrier (7) having a convex spherical formation (27) and mounted for universal action in a holder (17).

4. A transmitted-light illuminating device according to claim 1, characterized by the fact that said detent means comprises a shallow seat (11) in the diaphragm actuating ring, annular extensions (10-a-b-c) at the respective receiving openings of the turret, and spring means (19) continuously axially loading the turret (3) in the direction of engagement with said seat.

5. A transmitted-light illuminating device according to claim 1, characterized by the fact that the turret is of annular configuration and has a peripheral knurl (13), said configuration having plural differently shaped and angularly spaced markings (14, 15, 16) corresponding to the number of receiving openings.

6. A transmitted-light illuminating device according to claim 5, characterized by the fact that the markings are developed as actuating fingers (14, 15, 16) of different length.

7. A transmitted-light illuminating device according to claim 1, characterized by the fact that the condenser is mounted for vertical displacement, being guided by a sleeve formation (12a).

8. A transmitted-light illuminating device, comprising: frame means including an annular member for fixed mounting of said device, a condenser having an annular mount that is guided for axial displaceability within said frame member, and spring means coacting between said frame means and said annular mount and resiliently loading said condenser to a lower limit of axial positioning; iris-diaphragm means carried by an annular mount and including an annular adjustment ring which is rotatable between angularly spaced limits about the optical axis for determining the open/closed condition of said iris diaphragm; a multiple-station rotary turret having plural receiving openings at angularly spaced locations about and at equal radial offsets from a central indexing axis thereof; an index shaft mounting the turret to said adjustment ring with the turret axis parallel to and eccentrically offset from the optical axis; said eccentric offset equalling said radial offsets, whereby successive receiving openings can be indexed into register with the optical axis; and detent means including second spring means and coacting formations associated with said diaphragm means and with each of the receiving openings, said coacting formations causing transient axial displacement of said annular mount against the resilient loading of said second spring means in the course of indexing displacement of each successive one of said receiving openings into and out of its position of registration with the optical axis, the torsional resistance of such detent action exceeding the torsional resistance of the annular adjustment ring between said limits, whereby for turret-indexing rotation in the same rotary direction as that required for driving the diaphragm to its open limit, there is assurance of a fully open diaphragm condition for all turret-indexing rotation in said direction.

9. A transmitted-light illuminating device according to claim 8, wherein a seating ring axially supports said annular mount at its lower limit of axial positioning, said seating ring being rotatable about the optical axis, and said seating ring and annular mount having coacting sawtooth-wedge formations for incrementally axially elevating said annular mount against the resilient loading of said spring means upon incremental angular rotation of said seating ring with respect to said annular mount, and lever means associated with said seating ring for imparting such incremental angular rotation.

* * * * *